(12) United States Patent
Robledo Bueno

(10) Patent No.: US 10,583,936 B2
(45) Date of Patent: Mar. 10, 2020

(54) METHOD FOR DYNAMIC CONTROL OF RUNWAY ILLUMINATION ON AIRCRAFT

(71) Applicant: Airbus Operations, S.L., Getafe (ES)

(72) Inventor: Jesús Robledo Bueno, Getafe (ES)

(73) Assignee: AIRBUS OPERATIONS S.L., Getafe (ES)

( * ) Notice: Subject to any disclaimer, the term of this patent is extended or adjusted under 35 U.S.C. 154(b) by 0 days.

(21) Appl. No.: 16/281,962

(22) Filed: Feb. 21, 2019

(65) Prior Publication Data

US 2019/0263536 A1 Aug. 29, 2019

(30) Foreign Application Priority Data

Feb. 28, 2018 (EP) .................................. 18382121

(51) Int. Cl.
*B64D 47/04* (2006.01)
*H05B 33/08* (2020.01)

(52) U.S. Cl.
CPC ......... *B64D 47/04* (2013.01); *H05B 33/0854* (2013.01); *B64D 2203/00* (2013.01)

(58) Field of Classification Search
CPC . B64D 47/04; B64D 2203/00; H05B 33/0854
USPC ....................................................... 315/77
See application file for complete search history.

(56) References Cited

U.S. PATENT DOCUMENTS

| 2005/0090947 | A1 | 4/2005 | Wise |
| 2005/0240347 | A1* | 10/2005 | Yang .................. G01O 21/16 701/500 |
| 2011/0198997 | A1 | 8/2011 | Curtis |
| 2015/0146442 | A1* | 5/2015 | Bonnefous ............. B64D 47/04 362/467 |
| 2016/0076722 | A1 | 3/2016 | Hessling von Heimendahl |
| 2017/0355470 | A1 | 12/2017 | Keller et al. |

FOREIGN PATENT DOCUMENTS

| EP | 2995501 A1 | 3/2016 |
| EP | 2176127 B1 | 10/2016 |
| EP | 3254972 A1 | 12/2017 |

OTHER PUBLICATIONS

European Search Report, priority document.

\* cited by examiner

*Primary Examiner* — Don P Le
(74) *Attorney, Agent, or Firm* — Greer, Burns & Crain, Ltd.

(57) ABSTRACT

A method for dynamic control of runway illumination on aircraft, suitable for controlling the illumination of a light equipment comprising a LED matrix and refraction optics during a flight phase. The method comprises the steps of a) determining predefined flight dynamic movement equations for the flight phase, b) obtaining real data from autonomous sensors independent from the aircraft sensors, c) using extended Kalman Filter and algorithm taking into account the data from the autonomous sensors to obtain the aircraft dynamics data. This step c) comprises the c1) predict phase and c2) update phase, and d) applying the obtained aircraft dynamics data to light control laws affecting the light equipment.

7 Claims, 4 Drawing Sheets

METHOD FOR DYNAMIC CONTROL OF RUNWAY ILLUMINATION ON AIRCRAFT

CROSS-REFERENCES TO RELATED APPLICATIONS

This application claims the benefit of the European patent application No. 18382121.4 filed on Feb. 28, 2018, the entire disclosures of which are incorporated herein by way of reference.

FIELD OF THE INVENTION

The invention refers to a method for dynamic control of runway illumination on aircraft, whose main purpose is to improve light performances depending on flight phase, aircraft attitude and speed.

BACKGROUND OF THE INVENTION

Currently the runway illumination on aircraft is usually performed with fixed lights used for different phases (taxiing, take off, landing . . . ), that are manually switched on/off by the pilot depending on the flight phase.

However, some prior art documents disclose dynamic lighting systems for aircraft.

US 2015146442 A1, referred to an "Optical lighting system for an aircraft," discloses an optical lighting system for an aircraft that includes an optical unit that can be configured according to the phases of flight or taxiing of the aircraft in order to emit a beam of light, the spread and aim characteristics of which are dependent on the phases of flight or of taxiing.

EP 2995501 A1, referred to a "Dynamic aircraft headlight and method of operating a dynamic aircraft headlight," discloses a dynamic aircraft headlight that includes a LED group, having a plurality of LEDs, and an optical system, comprising at least one optical element, the optical system being associated with the LED group for shaping an output light intensity distribution from the light emitted by the LED group, wherein the LED group and the optical system are stationary within the dynamic aircraft light unit, with each LED of the LED group having a set position with respect to the optical system and with a light output of each LED being affected differently by the optical system. Each LED of the LED group is individually controllable, and the dynamic aircraft headlight is configured to be operated in a plurality of operating modes, with a respective selected subset of the plurality of LEDs being switched on in each of the plurality of operating modes, and with a different output light intensity distribution being emitted by the dynamic aircraft headlight in each of the plurality of operating modes.

EP 2176127, referred to an "Aircraft light unit," relates, in particular, to aircraft light units used when landing and taxiing an aircraft. This document provides an aircraft light unit comprising a first light source with a principal beam axis in a first direction and a second light source with a principal beam axis in a second direction, the second direction being different from the first direction. The first and second light sources are arranged such that they can combine to create a net light beam in a plurality of different directions by variation of the power supplied to the light sources.

In automotive technology, dynamic roadway illumination has been recently implemented depending on steering wheel position, car speed and even external cameras that help the driver to improve his perception of the roadway at night.

Different technical solutions from the automotive industry, as well as other possible inventions for performing dynamic illumination of the runway for the aircraft, could be possible (for example, LED matrix, movable and directional lamps, etc.).

However, the control of the devices corresponding to those solutions would require communication between the different light elements and the aircraft navigation and flight computers. This could be expensive and hard to implement in an already existing aircraft (it involves wiring, communication protocols, etc.).

SUMMARY OF THE INVENTION

Accordingly, an object of the present invention is to provide a method for dynamic control of runway illumination on aircraft in a completely autonomous way, independent from the aircraft.

The invention provides a method for dynamic control of runway illumination on aircraft, suitable for controlling the illumination of a light equipment comprising a LED matrix and refraction optics during a flight phase, the method comprising the following steps:

a) Determination of predefined flight dynamic movement equations for the flight phase, b) Obtention of real data from autonomous sensors independent from the aircraft sensors, c) Use of extended Kalman Filter and algorithm taking into account the data from the autonomous sensors to obtain the aircraft dynamics data, this step comprising the following phases:

c1) Predict phase c2) Update phase d) Application of the obtained aircraft dynamics data to light control laws affecting the light equipment.

The aircraft dynamics data can be the aircraft attitude (pitch, roll and yaw) and the aircraft speed.

Depending on the vector of state ($x_t$) chosen for the application (for example, speed, pitch angle, etc.) different control laws for the LEDs of the light equipment (power, LED choice in a matrix) could be implemented.

Another advantage of the invention is that it allows a full control of the light equipment. For instance, it can control not only the direction of the light, but also other parameters, as intensity, light distribution, etc.

Other characteristics and advantages of the present invention will be clear from the following detailed description of several embodiments illustrative of its object in relation to the attached figures.

DETAILED DESCRIPTION OF THE PREFERRED EMBODIMENTS

The method for dynamic control of runway illumination on aircraft is suitable for controlling the illumination of a light equipment comprising a LED matrix and refraction optics. The following steps describe an example of the application of the method for the evaluation of a specific flight phase of the aircraft (take-off). The same methodology, but with different flight dynamic equations and sensor measurements could be used, so that it is included only as an example:

a) Determination of predefined flight dynamic movement equations.

Figure 1:
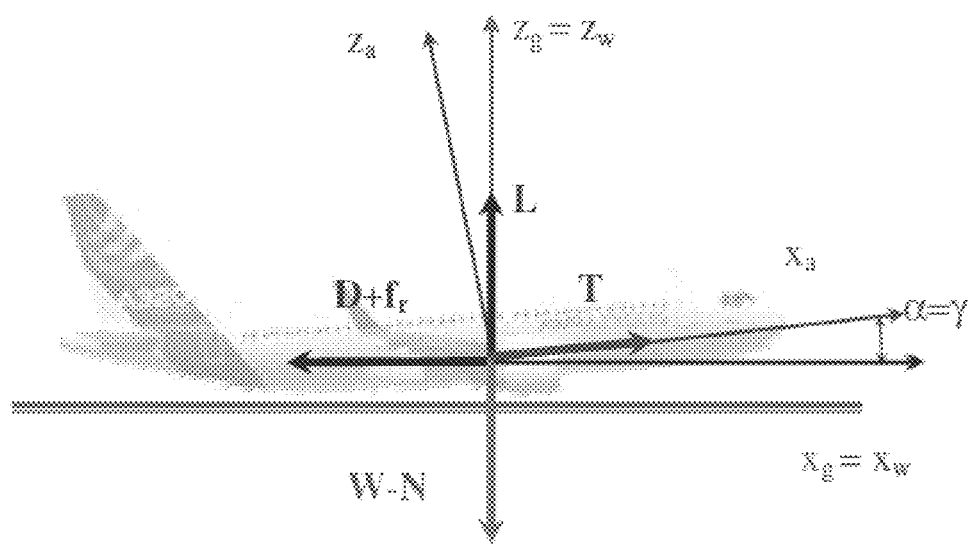
FIG. 1 is a schematic view of an aircraft on the ground, showing the forces acting on the aircraft.

During the take-off phase, we will consider two different situations:

Ground Phase:

During this phase, one or all wheels are in contact with the ground (so lift is not enough for taking off). There is a normal force from the ground (N) that creates a friction against the aircraft displacement ($f_r$). Ground and wind axis remain parallel and the angle of attack ($\alpha$) is equal to the aircraft pitch ($\gamma$). Drag (D) and lift (L) forces are applied on wind axis, thrust (T) in aircraft axis and weight (W) in ground axis. These forces, which act during the ground phase, can be seen in FIG. 1.

In this scenario, the motion equations applied on wind axis are:

$$T\cos\alpha - D - f_r = \frac{W}{g}\frac{dV}{dt} \quad (e1)$$

$$L + T\sin\alpha + N = W \quad (e2)$$

Figure 2:
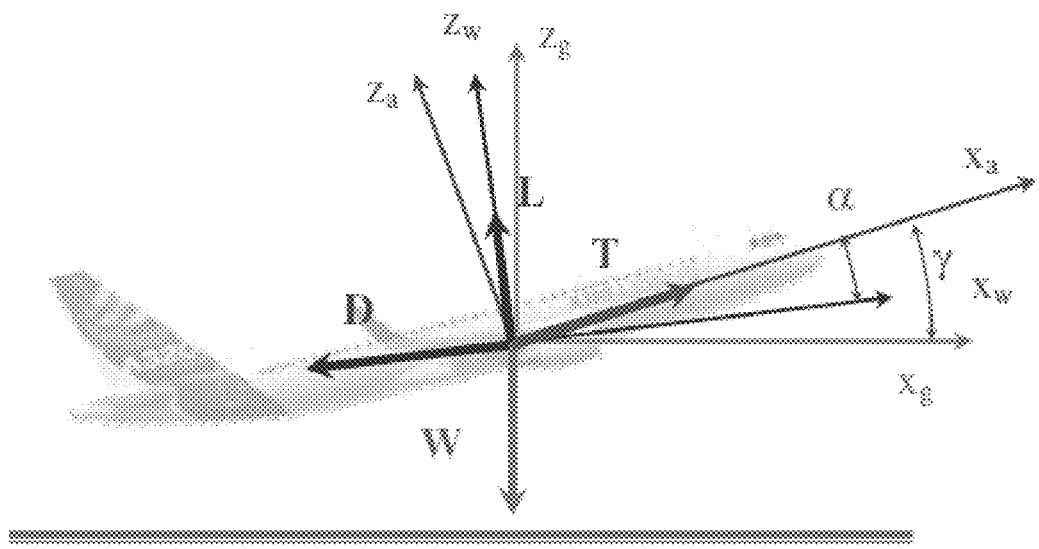
FIG. 2 is a schematic view of an aircraft during the takeoff phase, showing the forces acting on the aircraft.

Take-off Phase:

During this phase, the aircraft is in the air. There is no longer a normal force and a friction force, and the wind and aircraft axis present different angles with respect to the ground (see FIG. 2).

In this scenario, the motion equations applied on the wind axis are:

$$T\cos\alpha - D - W\sin(\gamma - a) = \frac{W}{g}\frac{dV}{dt} \quad (e3)$$

$$T\sin\alpha + L - W\cos(\gamma - \alpha) = \frac{W}{g}V\frac{d(\gamma - \alpha)}{dt} \quad (e4)$$

Additionally to those equations, normal force and aerodynamic forces are dependent on angle of attack and speed through:

$$L = \tfrac{1}{2}\rho S C_L V^2 = \tfrac{1}{2}\rho S(C_{L0} + C_{L\alpha}\alpha)V^2 \quad (e5)$$

$$D = \tfrac{1}{2}\rho S C_D V^2 = \tfrac{1}{2}\rho S(C_{D0} + kC_L^2)V^2 \quad (e6)$$

$$f_r = \mu N \quad (e7)$$

Where the following parameters are considered:
$\rho$ is the air density—It is a known value
S is the wing surface—It is a known value for a specific aircraft
g is gravity acceleration (9.81 m/s2)
$C_{L0}$ is the lift coefficient for 0 angle of attack—It is a known value for a specific aircraft
$C_{L\alpha}$ is the lift coefficient parameter dependent on angle of attack—It is a known value for a specific aircraft
$C_{D0}$ is the constant drag coefficient—It is a known value for a specific aircraft
k is the polar coefficient—It is a known value for a specific aircraft
$\mu$ is the friction coefficient—It is a known value for a specific aircraft To follow a simplified approach, we will consider the coefficients $C_{L0}$, $C_{L\alpha}$, $C_{D0}$ and k constants during the process, although there will be second order effects as ground effect, landing gear and flaps retraction that will impact them.

b) Obtention of real data from autonomous sensors independent from the aircraft sensors.

For this particular example there will be pitch rate (y-axis gyroscope) and accelerations in x and z, considering aircraft axis (as the sensors are fixed in the aircraft). These measurements are obtained from a gyroscope and two accelerometers properly oriented with the aircraft axis.

c) Use of extended Kalman Filter and algorithm taking into account the data from the autonomous sensors to obtain the aircraft dynamics data (aircraft attitude, speed).

The components used for the Kalman filter are described below:
State of the system vector for instant t: $x_t$
Vector of sensor measurements: $z_t$
State transition model: function f( ) for the process and $F_t$ for the Jacobian matrix based on it for instant t
Observation model: function h( ) for the model and $H_t$ for the Jacobian matrix based on it for instant t
Estimated error covariance: $P_t$
Covariance of the process noise: $Q_t$
Covariance of the observation noise: $R_t$
and the phases considered in the process in a sequential phase for the iterative process are as follows:

c1) Predict phase
(1) Predicted (a priori) state estimate from previous state: $x_t = f(x_{t-1})$
(2) Predicted (a priori) estimate error covariance: $P_t = F_{t-1}P_{t-1}F_{t-1}^T|Q_{t-1}$
c2) Update phase
(3) Measurement residual: $y_t = z_t - h(x_t)$
(4) Innovation covariance: $S_t = H_t P_t H_t^T + R_t$
(5) Optimal Kalman gain: $K_t = P_t H_t^T S_t^{-1}$
(6) Updated (a posteriori) state estimate: $x_{t+1} = x_t K_t y_t$
(7) Updated (a posteriori) estimate error covariance: $P_{t+1} = (I - K_t H_t)P_t$ In this example, we will use the following state variables for the vector $x_t$:
Aircraft ground speed (V)
Angle between wind and ground axis ($\beta = \gamma - \alpha$)
Angle of attack ($\alpha$)
Prediction and the observation matrix are the Jacobians of the process equations.

In order to group the number of variables, the following substitutions are done:

$$T' = \frac{gT}{W} \quad (e8)$$

$$C'_D = \frac{g\rho S}{2W}C_D \quad (e9)$$

$$C'_L = \frac{g\rho S}{2W}C_L \quad (e10)$$

To simplify, we will change the variables $C_{L0}$, $C_{L\alpha}$, $C_{D0}$ and k by equivalents $C'_{L0}$, $C'_{L\alpha}$, $C'_{D0}$ and k'. With this change, and assuming small angles ($\cos\alpha \sim 1$ and $\sin\alpha \sim \alpha$), the equations used in the Kalman filter are:

$$\frac{dV}{dt} = T' - C'_D V^2 - \mu g + \mu C'_L V^2 \text{ -For ground} \quad (e11)$$

-continued $$\frac{dV}{dt} = T' - C'_D V^2 - g\beta \text{ -When aircraft is in the air} \quad (e12)$$

$$\frac{d\beta}{dt} = \frac{T'\alpha}{V} - C'_L V - \frac{g}{V^2} \quad (e13)$$

The measurements described in equation $y_t = z_t - h(x_t)$ in the update phase are the data from pitch rate (y-axis gyroscope) and accelerations in x and z, considering aircraft axis (as the sensors are fixed in the aircraft). To obtain the function h that converts the state variables into measurements, we need to transfer the inertia components $$\frac{dV}{dt} \text{ and } V\frac{d\beta}{dt},$$

as well as gravity from wind axis into aircraft axis.

Based on this, the matrix equations described in predict and update phase will be as follows (when aircraft is on air; similar ones are obtained when aircraft is on ground):

$$x_t = \begin{pmatrix} V_t \\ \dot{V}_t \\ \beta_t \\ \dot{\beta}_t \\ \alpha_t \\ \dot{\alpha}_t \end{pmatrix} = f(x_{t-1}) = \begin{pmatrix} V_{t-1} + \delta t \dot{V}_{t-1} \\ T_{t-1} - C'_D(\alpha_{t-1})V_{t-1}^2 - g\beta_{t-1} \\ \beta_{t-1} + \delta t \dot{\beta}_{t-1} \\ \frac{T_{t-1}\alpha_{t-1}}{V_{t-1}} + C'_L(\alpha_{t-1})V_{t-1} - \frac{g}{V_{t-1}} \\ \alpha_{t-1} + \delta t \dot{\alpha}_{t-1} \\ \dot{\alpha}_{t-1} \end{pmatrix} \quad (e14)$$

(used in 1)

$$h(x_t) = \begin{pmatrix} \alpha + \beta \\ -\dot{V} - g(\alpha + \beta) - \alpha V\dot{\beta} \\ \alpha \dot{V} - V\dot{\beta} - g \end{pmatrix} \text{ used in 3} \quad (e15)$$

and the Jacobians, $$F_{t-1} = \frac{\partial f}{\partial x} = \begin{pmatrix} 1 & \delta t & 0 & 0 & 0 & 0 \\ -2VC'_D(x_{t-1}) & 0 & -g & 0 & -2V^2 C'_{L_\alpha} C'_L(x_{t-1}) & 0 \\ 0 & 0 & 1 & \delta t & 0 & 0 \\ 0 & 0 & 0 & 1 & 0 & 0 \\ 0 & 0 & 0 & 0 & 1 & \delta t \\ 0 & 0 & 0 & 0 & 0 & 1 \end{pmatrix} \quad (e16)$$

(Jacobian of e14)

$$H_t = \frac{\partial h}{\partial x} = \begin{pmatrix} 0 & 0 & 0 & 1 & 0 & 1 \\ -\alpha\dot{\beta} & -1 & -g & -\alpha V & -g - V\dot{\beta} & 0 \\ -\dot{\beta} & -\alpha & 0 & V & & -\dot{V} & 0 \end{pmatrix} \quad (e17)$$

(Jacobian of e15)

For the process noise matrix and measurement noise matrix, we followed a very simplified approach where no interdependencies were considered, so matrices $Q_{t-1}$ and $R_t$ are simply:

$$Q_{t-1} = \begin{pmatrix} n_V & 0 & 0 & 0 & 0 & 0 \\ 0 & n_{\dot{V}} & 0 & 0 & 0 & 0 \\ 0 & 0 & n_\beta & 0 & 0 & 0 \\ 0 & 0 & 0 & n_{\dot{\beta}} & 0 & 0 \\ 0 & 0 & 0 & 0 & n_\alpha & 0 \\ 0 & 0 & 0 & 0 & 0 & n_{\dot{\alpha}} \end{pmatrix} \quad (e18)$$

$$R_k = \begin{pmatrix} n_{g_y} & 0 & 0 \\ 0 & n_{\alpha_x} & 0 \\ 0 & 0 & n_{\alpha_z} \end{pmatrix} \quad (e19)$$

d) Application of the obtained aircraft dynamics data to light control laws affecting the light equipment.

For example, the intensity, direction and the light distribution of the LEDs in the light equipment can be determined.

Figure 3A:
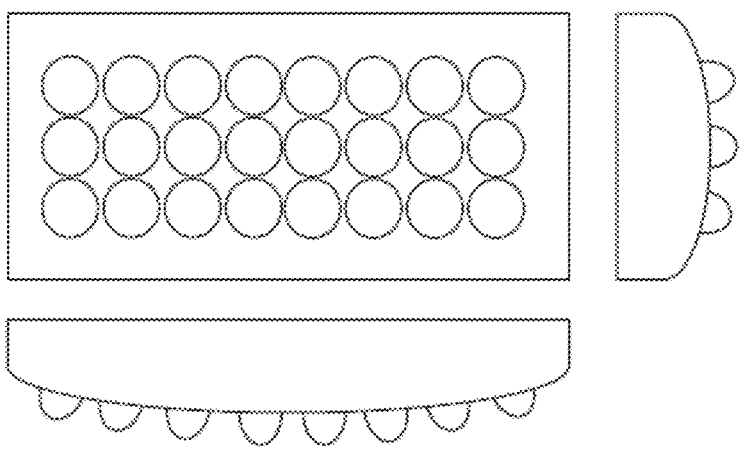
FIGS. 3A to 3E are different views showing the illumination of a light equipment with a matrix of LEDs in several situations.
Figure 3B:
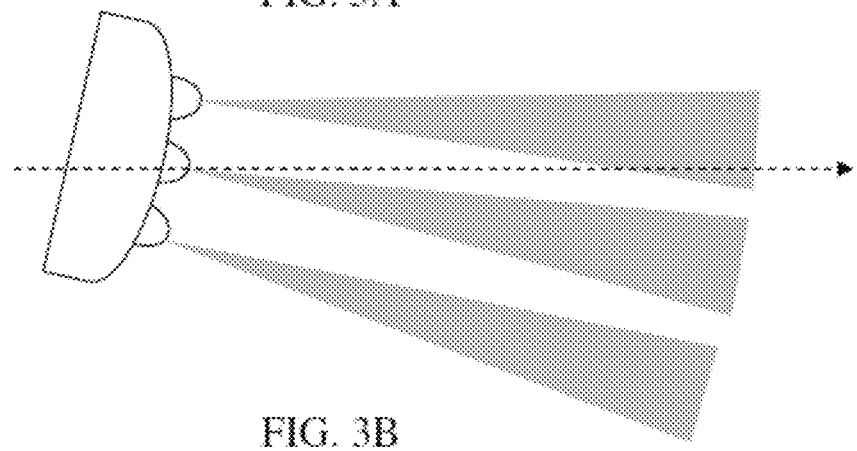
Figure 3C:
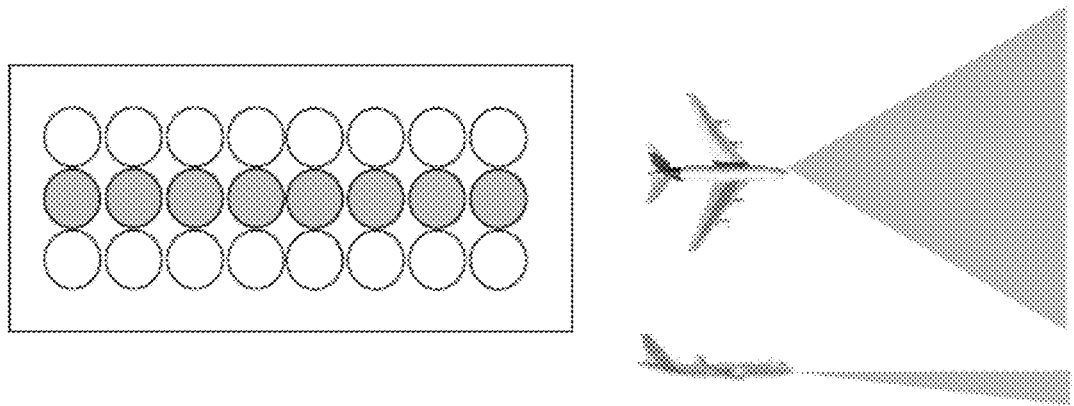
Figure 3D:
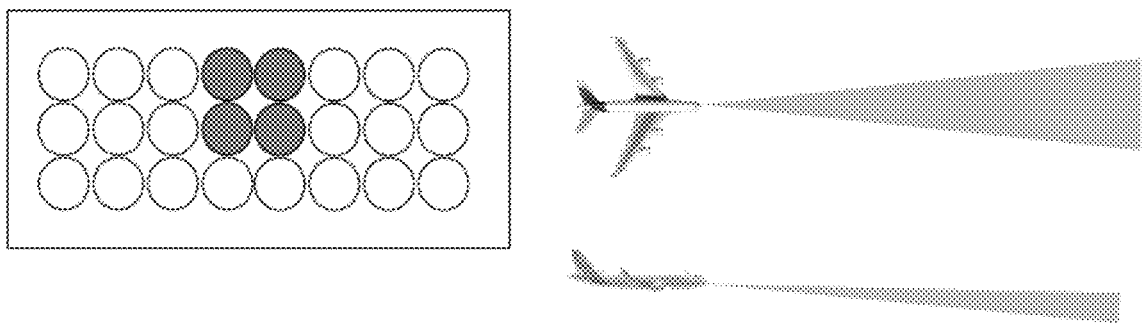
Figure 3E:
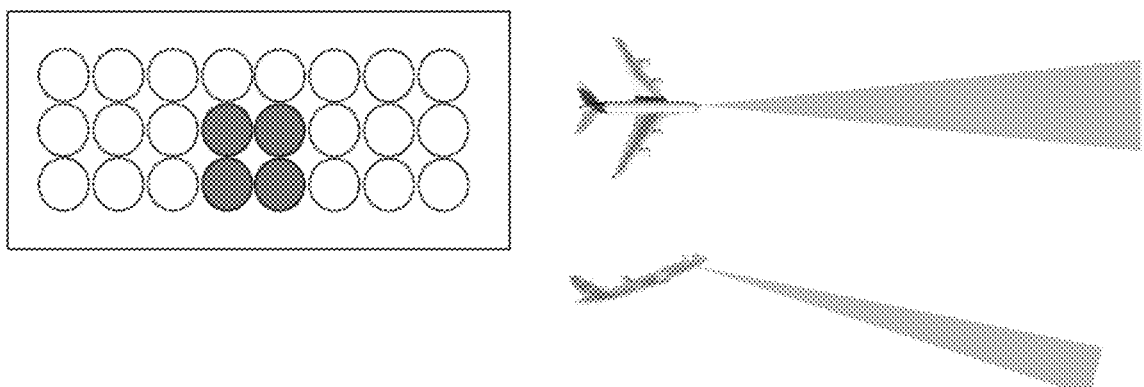

In this particular example, two of the parameters included in the state vector are considered: speed (V) and pitch angle (γ). Based on these two parameters, an example of possible light control application (not intended to be limited to this example, neither with the light solution implemented) can be considered as follows:

Consider a light architecture based in a matrix of 8×3 LEDs as described in FIG. 3a, where each of the LEDs can be operated independently of the others in terms of power. The LEDs are oriented in a way or have an optical element that allows covering 90° in horizontal plane and 30° in vertical plane. The light could be oriented as described in FIG. 3b and operated as follows:

During the taxi and start of the takeoff phase (low speeds), the pilot could be more interested in a wide short-range illumination to detect runway signals. In that way, all the LEDs of the central row could be powered at less than 100% (for instance, 25%) of their power as seen in FIG. 3c As soon as speed increases, the pilot could be more interested in a narrow illumination beam to detect possible long-distance obstacles, so the final illumination set up could consist of 100% power of 2 central LEDs of central and top rows as seen in FIG. 3d. The transition from one configuration to the other one could be done progressively as a function of the speed (V) obtained from the Kalman filter Once the aircraft starts the rotation, the beam would no longer illuminate the runway. The runway could be kept illuminated if the LEDs used would be 100% of the 2 central LEDS of the central and bottom rows as seen in FIG. 3e. The transition from one configuration to the other one could be done progressively as a function of the pitch angle (γ) obtained from the Kalman filter.

The control is based only in off the shell sensors used in other general electronic market as for smartphones, etc. Those sensors could cover (not limited to): Gyroscopes, Accelerometers, GPS, magnetometers, temperature and barometric pressure sensors, etc.

Although the present invention has been fully described in connection with preferred embodiments, it is evident that modifications may be introduced within the scope thereof, not considering this as limited by these embodiments, but by the contents of the following claims.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for dynamic control of runway illumination on aircraft, suitable for controlling an illumination of a light equipment comprising a LED matrix and refraction optics during a flight phase, the method comprising the following steps:
   a) determining predefined flight dynamic movement equations including variables for weight, gravity, lift and drag for the flight phase,
   b) obtaining real data from autonomous sensors independent from aircraft sensors,
   c) using extended Kalman Filter and algorithm considering the data from the autonomous sensors to obtain the aircraft dynamics data, this step comprising the following phases:
      c1) predict phase,
      c2) update phase,
   d) applying the obtained aircraft dynamics data to light control laws affecting the light equipment.

2. A method for dynamic control of runway illumination on aircraft, suitable for controlling an illumination of a light equipment comprising a LED matrix and refraction optics applicable during the take-off flight phase, comprising the following steps:
   a) determining predefined flight dynamic movement equations for the take-off flight phase:

$$T\cos\alpha - D - W\sin(\gamma - a) = \frac{W}{g}\frac{dV}{dt}$$

$$T\sin\alpha + L - W\cos(\gamma - \alpha) = \frac{W}{g}V\frac{d(\gamma - \alpha)}{dt}$$

$$L = \frac{1}{2}\rho S C_L V^2 = \frac{1}{2}\rho S(C_{L_D} + C_{L\alpha}\alpha)V^2$$

$$D = \frac{1}{2}\rho S C_D V^2 = \frac{1}{2}\rho S(C_{D_0} + kC_L^2)V^2$$

where the following parameters are considered:
   $\rho$ is an air density,
   S is a wing surface for the aircraft,
   g is gravitational acceleration,
   $C_{L0}$ is a lift coefficient for 0 angle of attack for the aircraft,
   $C_{L\alpha}$ is a lift coefficient parameter dependent on angle of attack for the aircraft,
   $C_{D0}$ is a constant drag coefficient for the aircraft,
   k is a polar coefficient for the aircraft,
where the following forces are considered:
   D: drag,
   L: lift,
   T: thrust,
   W: weight,
   b) obtaining real data from autonomous sensors independent from aircraft sensors comprising a y-axis gyroscope, an x-axis accelerometer and a z-axis accelerometer:
   a pitch rate being obtained from the y-axis gyroscope, accelerations in x and z being obtained from the two corresponding accelerometers,
   c) using extended Kalman Filter and algorithm taking into account data from the autonomous sensors to obtain the aircraft dynamics data comprising an aircraft pitch angle $\gamma$ and an aircraft speed V, wherein phases considered in a process in a sequential phase for an iterative process are as follows:
      c1) predict phase,
         (1) predicted (a priori) state estimate from previous state:

$$x_t = f(x_{t-1})$$

(2) predicted (a priori) estimate error covariance:

$$P_t = F_{t-1}P_{t-1}F_{t-1}^T + Q_{t-1}$$

c2) update phase
         (3) measurement residual:

$$y_t = z_t - h(x_t)$$

(4) innovation covariance:

$$S_t = H_t P_t H_t^T R_t$$

(5) optimal Kalman gain:

$$K_t = P_t H_t^T S_t^{-1}$$

(6) updated (a posteriori) state estimate:

$$x_{t+1} = x_t + K_t y_t$$

(7) updated (a posteriori) estimate error covariance:

$$P_{t+1}(I - K_t H_t)P_t$$

wherein components used for the Kalman filter are as follows:
      state of the system vector for instant $x_t$,
      vector of sensor measurements: $z_t$,
      state transition model: function f( ) for the process and $F_t$ for a Jacobian matrix based on the process for instant t,
      observation model: function h( ) for the model and $H_t$ for a Jacobian matrix based on the model for instant t,
      estimated error covariance: $P_t$,
      covariance of process noise: $Q_t$,
      covariance of observation noise: $R_t$,
   wherein the following state variables are used for vector $x_t$:
      aircraft ground speed: V,
      angle between wind and ground axis: $\beta = \gamma - \alpha$
      angle of attack: $\alpha$
   d) applying the obtained aircraft dynamics data comprising an obtained pitch angle $\gamma$ and the aircraft speed V to light control laws affecting the light equipment to determine an intensity, direction and light distribution of LEDs in the light equipment.

3. The method for dynamic control of runway illumination on aircraft, according to claim 2, wherein the LED matrix of the light equipment comprises several rows and columns where each of the LEDs can be operated independently of other LEDs in terms of power, illuminating each of them in different areas, and wherein in function of the speed V obtained from the Kalman filter in step c), the LED matrix can change the illumination state.

4. The method for dynamic control of runway illumination on aircraft, according to claim 2, wherein the LED matrix of the light equipment comprises several rows and columns where each of the LEDs can be operated independently of other LEDs in terms of power, illuminating each of them in different areas, and wherein in function of the pitch angle γ obtained from the Kalman filter in step c) the LED matrix can change the illumination state.

5. The method for dynamic control of runway illumination on aircraft, according to claim 1, wherein the autonomous sensors comprise at least one of gyroscopes, accelerometers, GPS, magnetometers, temperature sensors or barometric pressure sensors.

6. A method for dynamic control of runway illumination on aircraft, suitable for controlling an illumination of a light equipment comprising a LED matrix and refraction optics applicable during the take-off flight phase, comprising the following steps:
 a) determining predefined flight dynamic movement equations for the take-off flight phase:

$$T\cos\alpha - D - W\sin(\gamma - a) = \frac{W}{g}\frac{dV}{dt}$$

$$T\sin\alpha + L - W\cos(\gamma - \alpha) = \frac{W}{g}V\frac{d(\gamma - \alpha)}{dt}$$

$$L = \frac{1}{2}\rho S C_L V^2 = \frac{1}{2}\rho S(C_{L_0} + C_{L\alpha}\alpha)V^2$$

$$D = \frac{1}{2}\rho S C_D V^2 = \frac{1}{2}\rho S(C_{D_0} + kC_L^2)V^2$$

where the following parameters are considered:
 ρ is an air density,
 S is a wing surface for the aircraft,
 g is gravitational acceleration,
 $C_{L0}$ is a lift coefficient for 0 angle of attack for the aircraft,
 $C_{L\alpha}$ is a lift coefficient parameter dependent on angle of attack for the aircraft,
 $C_{D0}$ is a constant drag coefficient for the aircraft,
 k is a polar coefficient for the aircraft,
where the following forces are considered:
 D: drag,
 L: lift,
 T: thrust,
 W: weight,
 b) obtaining real data from autonomous sensors independent from aircraft sensors,
 c) using extended Kalman Filter and algorithm considering the data from the autonomous sensors to obtain the aircraft dynamics data, this step comprising the following phases:
  c1) predict phase,
  c2) update phase,
 d) applying the obtained aircraft dynamics data to light control laws affecting the light equipment.

7. The method for dynamic control of runway illumination on aircraft, according to claim 6, wherein the autonomous sensors comprise at least one of gyroscopes, accelerometers, GPS, magnetometers, temperature sensors or barometric pressure sensors.

* * * * *